(12) United States Patent
Kurokawa et al.

(10) Patent No.: US 6,461,456 B1
(45) Date of Patent: Oct. 8, 2002

(54) METHOD OF MANUFACTURING CYLINDRICAL ELECTROPHOGRAPHIC PHOTOCONDUCTOR AND METHOD OF DETECTING ADHESIVE AT OPENING END PORTION OF THE PHOTOCONDUCTOR

(75) Inventors: Keiichi Kurokawa; Tadayuki Okuhara, both of Nagano (JP)

(73) Assignee: Fuji Photo Imaging Device Co., Ltd., Nagano (JP)

(*) Notice: Subject to any disclaimer, the term of this patent is extended or adjusted under 35 U.S.C. 154(b) by 0 days.

(21) Appl. No.: 09/930,224

(22) Filed: Aug. 16, 2001

(30) Foreign Application Priority Data

Aug. 25, 2000  (JP) .......................... 2000-255560

(51) Int. Cl.$^7$ ..................... B65B 7/14; B29C 65/54
(52) U.S. Cl. ................... 156/64; 156/69; 156/304.2
(58) Field of Search ................... 156/64, 69, 360, 156/363, 356, 357, 378, 379, 304.1, 304.2, 578; 118/669; 427/207.1, 208.2, 208.4; 399/117

(56) References Cited

U.S. PATENT DOCUMENTS

| 4,976,797 | A | * | 12/1990 | Calvert et al. ................ 156/69 |
| 5,399,870 | A | * | 3/1995 | Torii et al. .................. 250/561 |
| 5,711,989 | A | * | 1/1998 | Ciardella et al. ............. 427/96 |
| 5,907,750 | A | * | 5/1999 | Yamada et al. ............. 399/116 |

\* cited by examiner

*Primary Examiner*—Richard Crispino
*Assistant Examiner*—George R. Koch, III
(74) *Attorney, Agent, or Firm*—Kanesaka & Takeuchi

(57) ABSTRACT

In a method of manufacturing a cylindrical electrophotographic photoconductor, an adhesive is applied to an inside of an opening end portion of a photosensitive drum, and the adhesive is detected by using a CCD laser displacement sensor. Then, a flange for supporting a center shaft to the inside of the opening end portion of the drum is fitted through the adhesive. The flange can be securely attached to the drum.

12 Claims, 3 Drawing Sheets

METHOD OF MANUFACTURING CYLINDRICAL ELECTROPHOGRAPHIC PHOTOCONDUCTOR AND METHOD OF DETECTING ADHESIVE AT OPENING END PORTION OF THE PHOTOCONDUCTOR

BACKGROUND OF THE INVENTION AND RELATED ART STATEMENT

The present invention relates to a method of manufacturing a cylindrical electrophotographic photoconductor having a photosensitive drum including a photosensitive layer and a flange for supporting a center shaft, in which the flange is interfitted through an adhesive to an opening end portion of the photosensitive drum. The invention also relates to a method of detecting the adhesive at the opening end portion of the photoconductor.

In the electrophotographic apparatuses that employ an electrophotographic photoconductor, copiers, to which the photoconductors first were applied, were mainly used practically in the early time. In addition to the copiers, laser printers and facsimile machines have now been widely spread as major applications due to the excellent characteristics including high image quality, high quality, and low noise, and the application range is rapidly expanding.

An electrophotographic photoconductor applied to such an electrophotographic apparatus includes a photosensitive drum, in which a photosensitive layer containing a photoconductive material is formed on an outer surface of a cylindrical conductive substrate or a drum, and a flange that supports a center shaft and is interfitted to the opening end portion of the photosensitive drum to transmit rotational driving force from the apparatus to the photosensitive drum.

For the conductive substrate or a drum, aluminum or aluminum alloy with a cylindrical shape, or a cylindrical resin provided with certain conductivity is used.

The photosensitive layer containing photoconductive material formed on the outer surface of the drum was generally composed of a vapor deposited film of photoconductive inorganic material, such as selenium or selenium alloy in the early period. Because the selenium material was considered about its toxicity, for preventing such a fear and from the view point of pursuit of diversity in characteristics and functions, searching for variety of substances, and aiming at reduction of cost, organic photoconductive materials have been rigorously researched.

From the researches, many kinds of photoconductive organic materials have been found including bisazo compounds, phthalocyanine compounds, hydrazone compounds and amine compounds.

From those materials, a material meeting the required characteristic is selected, and while combining with a resin material, dispersed or dissolved in a solvent to obtain a coating liquid. The coating liquid is dip-coated on the outer surface of the above-described drum to form a single-layer or laminated-layer coating film. Such a coating film has become widely employed for an organic photosensitive layer.

The photosensitive drum having such an organic photosensitive layer is mounted on an electrophotographic apparatus, such as a copier or a printer, with a mechanism that allows turning by receiving rotational driving force from the side of the apparatus. On the side of the photosensitive drum, a flange fitted to the opening end portion of the drum serves a function to transmit the rotational driving force to the drum. Accordingly, the flange has a gear on the periphery thereof and a center hole supporting a center shaft.

For assuring this mechanism of transmitting the rotational driving force served by the flange, it is important for the flange and for the photosensitive drum to turn without slip therebetween and to be connected securely together for a long time. Consequently, the flange and the photosensitive drum are usually joined with an adhesive to secure the connection surviving for a long period.

FIG. 2 is an illustration of a photosensitive drum having a photosensitive layer 1—1. An adhesive 3 is applied to an opening end portion 2 of the photosensitive drum 1 by providing the adhesive to the predetermined region with a height or thickness from the tip of an adhesive dispenser 4.

Because the photosensitive drums of the electrophotographic photoconductors have various diameters or lengths, and the flanges also have various shapes depending on the types of the photoconductors, the position and the applied configuration of the adhesive must be adjusted according to the dimensions of the photoconductors. Consequently, the discharge from the dispenser is controlled for each of the photosensitive drums so that the depth from the end of the drum and application length in the circumferential direction are adjusted to proper values. The adhesive application in the circumferential direction is effectively performed by turning the photosensitive drum. The circumferential adhesive application to the inside of the opening end portion by discharging from the dispenser is not conducted to the complete perimeter since a grounding plate is required to be conductively contacted to the substrate as described later. The circumferential length of the adhesive is usually ½ or ⅓ of the perimeter according to requirement.

FIG. 3 is an illustration showing a flange attached to an electrophotographic photoconductor in an embodiment of the present invention. The main part of the flange 5 is made of a resin material and formed by injection molding to have a gear 6 on the periphery and a center hole 7 in the center for supporting a center shaft 9.

Rotational driving force is transmitted from the side of the apparatus through the gear 6 to the photosensitive drum. A grounding plate 8 made of an elastic metal material is attached to the flange 5. The grounding plate 8 makes the photosensitive drum electrically contacting the center shaft 9 made of a rigid metal, such as stainless steel, and functions to ground the charge carriers generated on the side of the photosensitive drum to the side of the apparatus. The flange 5 is fitted into the photosensitive drum with the side of the grounding plate 8 facing the drum. At that time, if the position on the side of the photosensitive drum corresponding to the position of the contact point 12 of the grounding plate 8 is applied with adhesive, then it often causes defective electrical conductivity. Therefore, an area without adhesive application is necessary to be conserved on the inside of the opening end portion 2 of the photosensitive drum.

However, when the adhesive is applied to the inside of the opening end portion of the photosensitive drum, it is unavoidable to have some abnormal state of departing from the designed shape of the adhesive, such as unapplied region, ununiformity, blur, and deviated position of the applied adhesive. If the photoconductor is manufactured in such an abnormal adhesion state between the photosensitive drum and the flange, and is mounted on an electrophotographic apparatus to operate the apparatus, the joint strength between the flange and the photosensitive drum can occasionally not withstand the rotational driving force received by the drum, and the joint may break resulting in failure of apparatus' function. When the adhesive used in the joint is transparent, in particular, like a commercially available instant adhesive, a detection method that takes advantage of difference in reflectivity between the substrate and the adhesive surface using an optical fiber sensor with a red LED, can not exactly detect the adhesive, thus, visual observation of the applied condition is indispensable. The visual observation is made periodically, not continuous from the viewpoint of production cost.

Here, the abnormal state of the applied adhesive slowly develops in usual, so the periodical visual observation is liable to delay notice of the abnormal state. When the abnormal state is found, the products often have already proceeded to the next fitting step. In such a case, it is necessary to go back the production steps and to conduct destructive inspection for selecting defective products. This kind of detection method is inferior in operating performance and in economy, and adversely affected productivity of a photoconductor.

The present invention has been made in view of the above-described problem, and an object of the invention is to provide a method of manufacturing a cylindrical electrophotographic photoconductor, wherein the method allows to detect, indicate and judge the applied condition of an adhesive including a transparent adhesive without contact, with high accuracy and high speed, and also to confirm measured records. By making sure the selection of the product that is defective in applied condition of the adhesive, the detachment of the flange from the electrophotographic photoconductor in use is prevented for a long period.

Another object of the invention is to provide a method of detecting an adhesive at the opening end portion of a cylindrical electrophotographic photoconductor.

Further objects and advantages of the invention will be apparent from the following description of the invention.

SUMMARY OF THE INVENTION

In a method of manufacturing a cylindrical electrophotographic photoconductor having a photosensitive drum and a flange that supports a center shaft and is fitted to the inside of an opening end portion of the photosensitive drum, the object of the invention is accomplished by the method comprising a step of detecting the adhesive using a CCD laser displacement sensor after applying the adhesive to the opening end portion and before fitting the drum with the flange.

Advantageously, the height of the adhesive is measured with the displacement sensor in the step of detecting the adhesive of the manufacturing method.

Advantageously, the measurement of the height of the adhesive is conducted by scanning the displacement sensor in an axial direction in the step of detecting the adhesive of the manufacturing method.

Advantageously, in the step of detecting the adhesive of the manufacturing method, a shape of the applied adhesive is detected by using the CCD laser displacement sensor after applying the adhesive to the opening end portion and before fitting the drum with the flange.

Advantageously, in the step of detecting the adhesive of the manufacturing method, detecting the shape of the applied adhesive is conducted by turning the photosensitive drum while scanning the displacement sensor in the axial direction.

Advantageously, the adhesive applied to the opening end portion is a transparent adhesive in the method of manufacturing the cylindrical electrophotographic photoconductor.

Further, a method for detecting an adhesive at an opening end portion of the present invention, in a step for detecting the adhesive using a CCD laser displacement sensor after applying the adhesive to the opening end portion and before fitting the drum with the flange, comprises a process of judging the presence or absence of the adhesive by taking the region without the adhesive as a base for a height measurement and making a height higher than the base by a certain value to be a threshold level.

The detection of the adhesive using the CCD displacement sensor in the present invention is conducted by determining the basic height at the base position and by measuring the adhesive height every moment while moving the sensor in the axial direction of the photosensitive drum or simultaneously turning the drum, to obtain a chart plotted in two dimensions or three dimensions with the abscissa being the axial position in the drum and the ordinate being the height or thickness of the adhesive. Here, for accurate judgement of the presence or absence of the adhesive, it is preferable to take the difference between the base position and the height of the internal surface of the drum at the interior side with respect to the applied adhesive as a threshold value in order to compensate for slant of the drum axis from the horizontal axis.

DETAILED DESCRIPTION OF PREFERRED EMBODIMENTS

Specific examples of the embodiments of a method of manufacturing a cylindrical electrophotographic photoconductor and a method for detecting an adhesive at an opening end portion of the photoconductor of the invention will be described in detail with reference to the accompanying drawings. It should be noted that the invention should not be limited to the examples described below.

A charge generation layer and a charge transport layer are formed in this order by dip-coating on an outer surface of a drum substrate having the outer diameter of 30 mm and the length of 325 mm made of JIS 6000 series aluminum alloy. A coating film dispersing titanylphthalocyanine, a well-known photo-electric charge generating material, in a polyvinylbutyral resin is used for a material of the charge generation layer.

Figure 2:
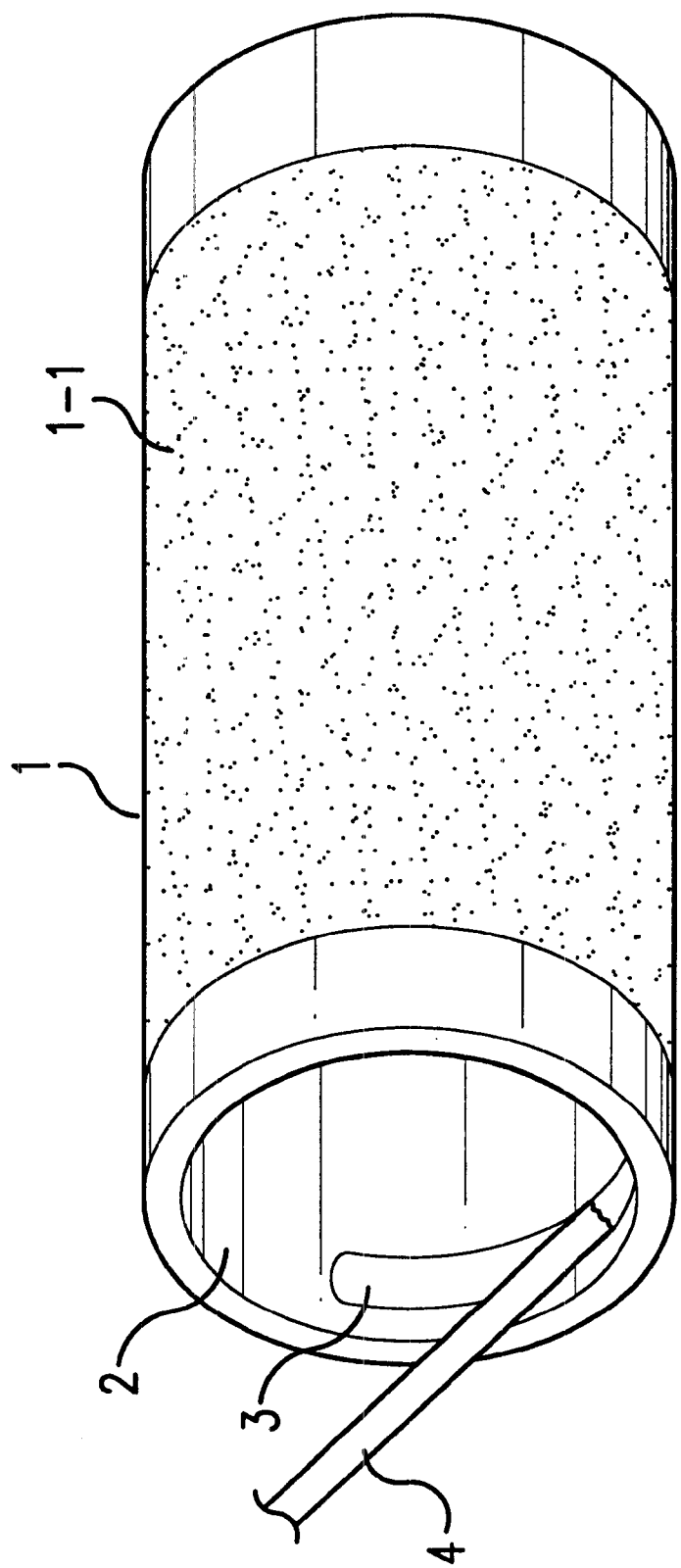
FIG. 2 is a perspective view showing a situation of applying an adhesive to an opening end portion of the photosensitive drum in the manufacturing method used in the present invention.

A coating film dissolving hydrazone, a well-known charge transport material, in a polycarbonate resin is used for a material of the charge transport layer. Materials for the substrate and a photosensitive layer are only required to satisfy appropriate characteristics as materials for a photoconductor, and a material other than the above examples may be used. Coating methods other than the well-known dip-coating may be employed as well. In a photosensitive drum 1 formed of a substrate and a photosensitive layer, an adhesive 3 is applied to the drum by ejection from the dispenser 4 as shown in FIG. 2 in order to secure the connection between the photosensitive drum and a flange fitted to the inside of the opening end portion of the drum. The adhesive used is Locktight 403, a commercially available transparent instant adhesive, while another transparent instant adhesive, Aron-alpha, for example, may be used.

Figure 3:
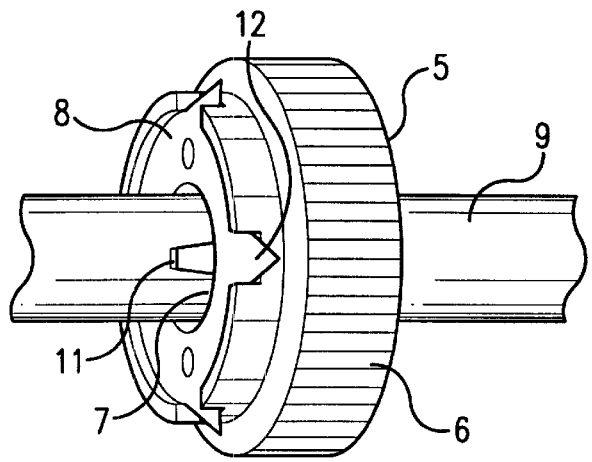
FIG. 3 is a perspective view of a flange in the manufacturing method used in the present invention.

FIG. 3 is an illustration of a flange 5 that is to be fitted to the photosensitive drum. The flange 5 is fitted into the drum with the side of the grounding plate 8 facing the photosensitive drum. The flange 5 is formed by injection molding of a polyacetal resin, for example. The flange 5 comprises a large diameter portion that touches the tip of the opening end portion 2 of the photosensitive drum 1, a small diameter portion that interfits to the inside of the drum when the flange is fitted to the drum, and a center hole 7 for supporting a center shaft 9 in the central part of the flange.

The grounding plate 8 is separately formed of a metallic elastic material and is attached to the small diameter portion. The grounding plate 8 electrically connects the photosensitive drum 1 to the center shaft 9 made of metal, and has contact points 11 and 12 contacting the drum 1 and the center shaft 9, respectively. When the flange 5 is fitted to the drum 1, if the adhesive is applied to the part of the drum at which the contact point 12 contacts, electrical continuity or conductivity may become defective. It is therefore important to prevent the region corresponding to the contact point 12 from being applied with the adhesive in applying the adhesive to the inside of the opening end portion 2 of the drum 1.

In the photoconductor of the present invention, a transparent adhesive is applied while controlling to a proper shape by ejecting from the dispenser 4 before interfitting the flange to the inside of the opening end portion of the photosensitive drum of the photoconductor to secure the connection between the flange and the drum. If the application of the adhesive deviates from the designed condition, defects of the flange in electrical continuity and mechanical connection may occur. Accordingly, measurement of the applied condition of the transparent adhesive and judgement of the presence or absence of the adhesive are made and the results are recorded before the interfitting, by using a CCD laser displacement sensor: LK-080/Amplifier LK-2000 manufactured by Keyence Company. Wavelength of the laser used in the sensor is 670 nm and the maximum output power is 0.95 mW.

The laser displacement sensor receives reflection light from the surface of the adhesive, even if it is a transparent adhesive, by means of the CCD and to plot the adhesive surface as a line. Therefore, the defect in the conventional optical fiber sensor using a red LED has been avoided, in which the error in the detection of the adhesive thickness increases when the difference in the reflected light intensity from the substrate and that from the adhesive surface decreases, as in the case of the transparent adhesive.

Figure 1A:
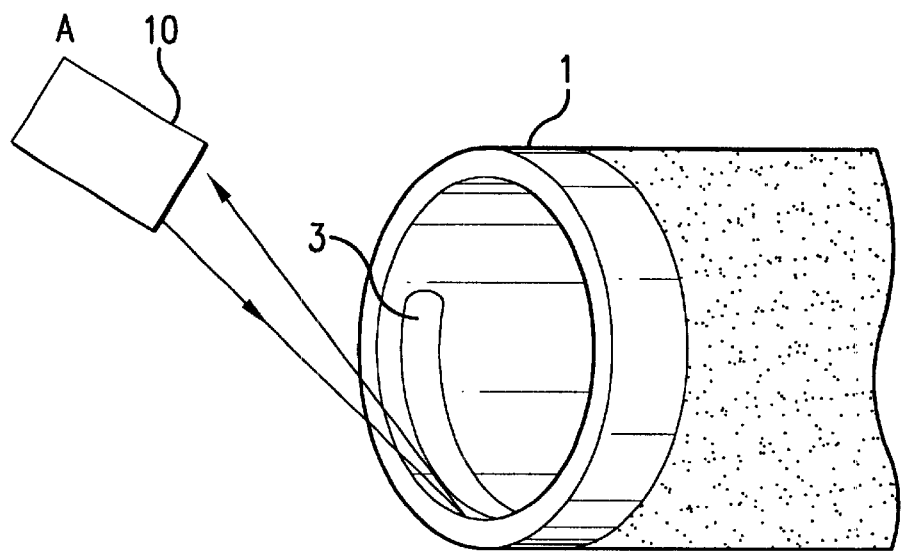
FIGS. 1($a$) and 1($b$) are explanatory views showing a step of detecting an adhesive using a CCD laser displacement sensor in a manufacturing method of an embodiment of the present invention.
Figure 1B:
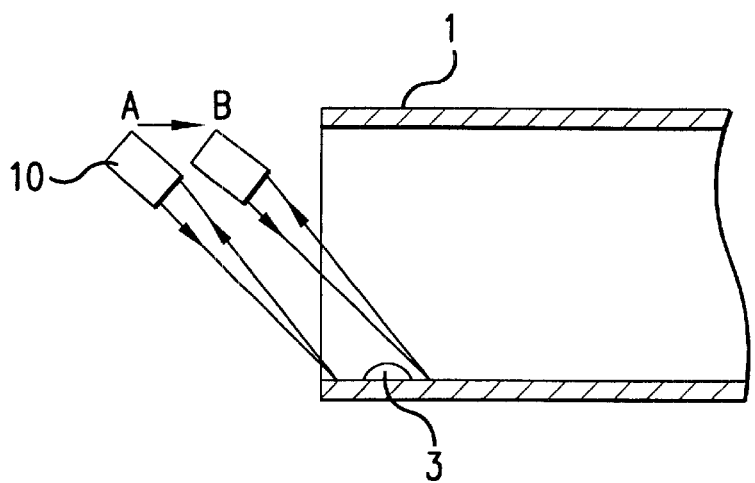

In the measurement of the applied condition shown in FIGS. 1(a) and 1(b), the CCD laser displacement sensor 10 is positioned at A that allows to see the transparent adhesive 3 applied on the inside of the opening end portion of the photosensitive drum as shown in FIG. 1(a), and the substrate surface at the inside of the opening end portion is measured by the sensor 10 as a base value. Then, the tip of the laser light is scanned from the front side of the adhesive to the interior side of the adhesive by moving the sensor from A to B as shown in FIG. 1(b).

Figure 4:
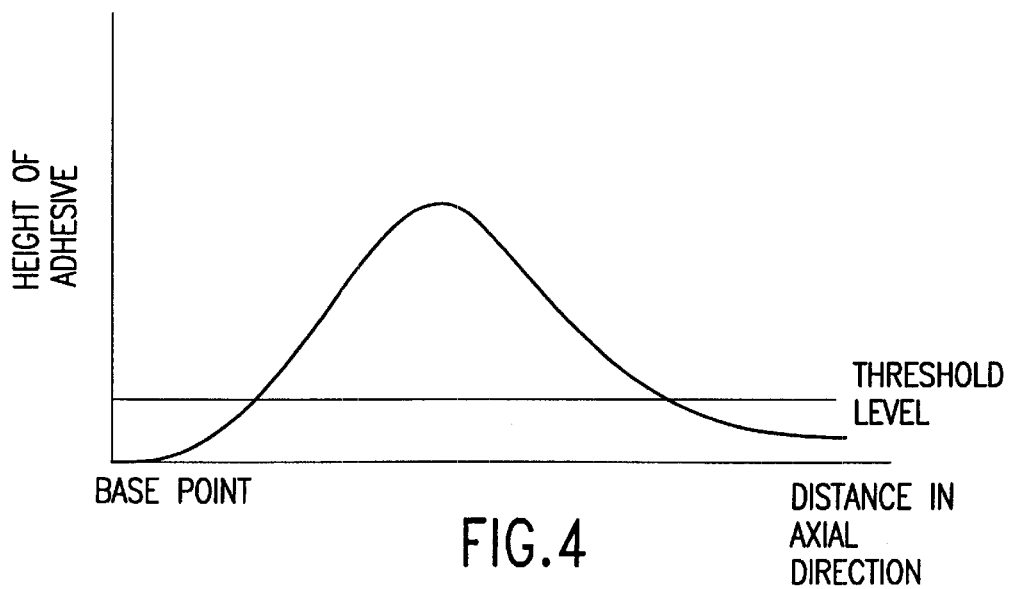
FIG. 4 is a chart of a plot showing a contour of the adhesive obtained in the step of detecting the adhesive in the manufacturing method of an embodiment of the present invention.

A plot of the height or thickness of the adhesive obtained by this measurement is shown in FIG. 4. Judgement of the presence or absence of the adhesive is made by the plot. In order to compensate for the fact that the axial direction of the photosensitive drum 1 generally is not completely horizontal, the judgement of the presence or absence of the adhesive is made by employing a threshold level that is a certain value greater than the difference between the base value at A and the measured value at B.

If the drum is turned more than one revolution while the sensor 10 is scanned from A to B, then a three-dimensional chart of the adhesive-applied region is obtained (not shown). Although the transparent adhesive has been used in the description so far, the present invention is, of course, effective for the adhesive that is opaque to visible light.

Now, experimental examples are given below, in which judgement of the presence or absence of the transparent adhesive was made by using the displacement sensor.

EXPERIMENTAL EXAMPLE

To each of ten photosensitive drums, Locktight 403, a transparent instant adhesive, was applied, and the adhesive was measured and judgement of the presence or absence of the adhesive was made.

TABLE 1

(unit: mm)

| Photosensitive drum No | Sample number difference in values at A and B | Height of applied adhesive |
| --- | --- | --- |
| sample No. 1 | 0.089 | 0.233 |
| sample No. 2 | 0.067 | 0.233 |
| sample No. 3 | 0.057 | 0.221 |
| sample No. 4 | 0.073 | 0.246 |
| sample No. 5 | 0.060 | 0.201 |
| sample No. 6 | 0.075 | 0.225 |
| sample No. 7 | 0.063 | 0.246 |
| sample No. 8 | 0.063 | 0.227 |
| sample No. 9 | 0.075 | 0.209 |
| sample No. 10 | 0.058 | 0.206 |

Observing the difference in the values at A and B of the ten photosensitive drums in Table 1, the threshold value was determined to be 0.1 mm and judgement of the presence or absence of the adhesive was made. All of the values of the height of the applied adhesive in this Experimental Examples were larger than 0.1 mm, indicating that there was no defective one.

A method of manufacturing the cylindrical electrophotographic photoconductor having a photosensitive drum and the flange that supports the center shaft and is fitted to the inside of the opening end portion of the drum according to the present invention comprises a step for detecting the adhesive using the CCD laser displacement sensor after applying the adhesive to the opening end portion and before fitting the flange to the drum. As a result, in the method, it is possible to measure, indicate and judge the applied condition of the adhesive including a transparent adhesive without contact, with high accuracy and high speed, and also to confirm the measured records. By making sure the selection of the product that is defective in applied condition of the adhesive, falling off of the flange from the electrophotographic photoconductor in the operating period of the electrophotographic apparatus is prevented for a long time. Thus, the manufacturing method is proved to be highly reliable.

Further, in a step for detecting the adhesive using the CCD laser displacement sensor after applying the adhesive to the opening end portion of the cylindrical electrophotographic photoconductor and before fitting the flange for supporting a center shaft to the drum, a judgement of the presence or absence of the adhesive is made by taking the region without the adhesive as a base for the height measurement and making a height higher than the base by a certain value to be a threshold level. Thus, the adhesive at the opening end portion of the photoconductor is surely detected without visual observation.

While the invention has been explained with reference to the specific embodiments of the invention, the explanation is illustrative and the invention is limited only by the appended claims.

What is claimed is:

1. A method of manufacturing a cylindrical electrophotographic photoconductor, comprising:
    applying an adhesive to an inside of an opening end portion of a photosensitive drum,
    detecting said adhesive using a CCD laser displacement sensor, and
    fitting a flange for supporting a center shaft to the inside of the opening end portion of the drum through the adhesive.

2. A method of manufacturing a cylindrical electrophotographic photoconductor according to claim 1, wherein a height of the adhesive is measured with said displacement sensor in a step of detecting the adhesive.

3. A method of manufacturing a cylindrical electrophotographic photoconductor according to claim 2, wherein said height of the adhesive is measured by scanning the displacement sensor in an axial direction of the drum in the step for detecting the adhesive.

4. A method of manufacturing a cylindrical electrophotographic photoconductor according to claim 1, wherein an applied shape of the adhesive is detected by using the displacement sensor after applying the adhesive to the opening end portion and before fitting the flange to the drum in the step of detecting the adhesive.

5. A method of manufacturing a cylindrical electrophotographic photoconductor according to claim 4, wherein said applied shape of the adhesive is detected by turning the drum while scanning the displacement sensor in an axial direction in the step for detecting the adhesive.

6. A method of manufacturing a cylindrical electrophotographic photoconductor according to claim 1, wherein said adhesive is a transparent adhesive.

7. A method of manufacturing a cylindrical electrophotographic photoconductor according to claim 1, wherein the flange is fitted in the drum only when the adhesive is properly applied inside the drum.

8. A method of detecting an adhesive at an opening end portion of a cylindrical electrophotographic photoconductor, comprising a step of detecting the adhesive using a CCD laser displacement sensor after applying the adhesive to the opening end portion, wherein a judgement of presence or absence of the adhesive is made in the step of detecting the adhesive by taking a region without the adhesive as a base for height measurement and making a height higher than the base by a certain value to be a threshold level.

9. A method of detecting an adhesive according to claim 8, wherein said step of detecting the adhesive is made before fitting a flange for supporting a center shaft to the opening end portion.

10. A method of manufacturing a cylindrical electrophotographic photoconductor, comprising:
    applying an adhesive to an inside of an opening end portion of a photosenstive drum,
    locating a CCD laser displacement sensor at one side of the photosensitive drum to be spaced apart therefrom,
    ejecting a laser light diagonally to the inside of the opening end portion of the drum.
    detecting a height of said adhesive by scanning the CCD laser displacement sensor in an axial direction of the drum, and
    fitting a flange for supporting a center shaft to the inside of the opening end portion of the drum through the adhesive.

11. A method of manufacturing a cylindrical electrophotographic photoconductor according to claim 10, wherein a presence or absence of the adhesive is judged in the step of detecting the height of the adhesive by taking a region without the adhesive as a base for a height measurement and making a height higher than the base by a certain value to be a threshold level.

12. A method of manufacturing a cylindrical electrophotographic photoconductor according to claim 11, wherein an applied shape of the adhesive is detected by turning the drum while scanning the displacement sensor in the axial direction in the step for detecting the adhesive, and the flange is fitted in the drum only when the adhesive is properly applied inside the drum.

* * * * *

UNITED STATES PATENT AND TRADEMARK OFFICE
CERTIFICATE OF CORRECTION

PATENT NO. : 6,461,456 B1
DATED : October 8, 2002
INVENTOR(S) : Keiichi Kurokawa et al.

It is certified that error appears in the above-identified patent and that said Letters Patent is hereby corrected as shown below:

Title page, Item [54], and Column 1, Line 2,
Item [54], change "ELECTROPHOGRAPHIC" to
-- ELECTROPHOTOGRAPHIC --;
Item [73], Assignee, change "Photo" to -- Electric --;

Column 1,
Line 53, delete the paragraph to continue to line 52.

Signed and Sealed this

Fourth Day of March, 2003

JAMES E. ROGAN
*Director of the United States Patent and Trademark Office*